(12) United States Patent
Schierbeek et al.

(10) Patent No.: US 11,118,691 B2
(45) Date of Patent: Sep. 14, 2021

(54) FLUID REGULATOR HAVING INTEGRAL FLUID PURGE MECHANISM

(71) Applicant: G.P. Reeves Inc., Holland, MI (US)

(72) Inventors: Ryan Schierbeek, Holland, MI (US); Kevin Reeves, Hamilton, MI (US); Wade Halma, Holland, MI (US); Kirk Brink, Holland, MI (US); Josh Hendrick, Wyoming, MI (US)

(73) Assignee: G.P. Reeves Inc., Holland, MI (US)

( * ) Notice: Subject to any disclaimer, the term of this patent is extended or adjusted under 35 U.S.C. 154(b) by 100 days.

(21) Appl. No.: 16/587,691

(22) Filed: Sep. 30, 2019

(65) Prior Publication Data

US 2021/0095769 A1 Apr. 1, 2021

(51) Int. Cl.
*F16K 1/52* (2006.01)
*F16K 1/54* (2006.01)
*F15B 15/22* (2006.01)

(52) U.S. Cl.
CPC .............. *F16K 1/52* (2013.01); *F15B 15/226* (2013.01); *F16K 1/54* (2013.01); *F15B 2211/422* (2013.01)

(58) Field of Classification Search
CPC .. F16K 1/52; F16K 1/54; F15B 15/226; F15B 2211/422
See application file for complete search history.

(56) References Cited

U.S. PATENT DOCUMENTS

| | | | |
|---|---|---|---|
| 2,896,660 A | 7/1959 | Lofink | |
| 3,310,065 A | 3/1967 | Godshalk | |
| 3,387,622 A | 6/1968 | Weinstein | |
| 3,411,523 A | 11/1968 | Lapera | |
| 3,451,421 A * | 6/1969 | Vicenzi | G05D 23/1852 137/495 |
| 4,257,450 A * | 3/1981 | Ollivier | F16K 31/1262 137/505.42 |
| 4,266,538 A | 5/1981 | Ruchti | |
| 4,275,764 A | 6/1981 | Baret | |
| 5,022,432 A * | 6/1991 | Engelbach | G05D 7/0106 137/495 |
| 5,452,741 A * | 9/1995 | Tomita | G05D 16/107 137/505.26 |
| 5,660,502 A | 8/1997 | Ferguson | |
| 5,755,224 A | 5/1998 | Good et al. | |
| 6,539,970 B1 | 4/2003 | Knowles et al. | |
| 8,402,995 B2 | 3/2013 | Zoller | |
| 2003/0066562 A1* | 4/2003 | Wakeman | G05D 16/107 137/505 |

* cited by examiner

*Primary Examiner* — Jessica Cahill
*Assistant Examiner* — Patrick C Williams
(74) *Attorney, Agent, or Firm* — Price Heneveld LLP

(57) ABSTRACT

A fluid regulator includes a housing that includes a flow path extending from an inlet to an outlet. A poppet valve is disposed within the flow path and that selectively allows a flow of fluid from the inlet to the outlet. A regulating interface adjusts a spring tension that is exerted toward the poppet valve. The regulating interface defines a boundary of the flow path and the spring tension defines a regulated flow of fluid through the flow path from the inlet to the outlet. A fluid purge mechanism is positioned within the regulating interface. The fluid purge mechanism adjusts the boundary of the flow path and manipulates the poppet valve to a maximum operating position to define a purging flow of the fluid from the inlet to the outlet.

13 Claims, 10 Drawing Sheets

FLUID REGULATOR HAVING INTEGRAL FLUID PURGE MECHANISM

FIELD OF THE INVENTION

The present invention generally relates to fluid regulators, and more specifically, a fluid regulator having a fluid purge mechanism that is integrally positioned within a regulating interface for the fluid regulator.

BACKGROUND OF THE INVENTION

Fluid regulators are included within fluid flow systems for regulating and adjusting flow of fluid through a particular system. Fluid regulators can include a mechanism that can be utilized for increasing or decreasing the amount of fluid that can flow through the particular fluid regulator. Certain mechanisms include a purge mechanism that allows for fluid to be flushed at a higher rate through the fluid regulator.

SUMMARY OF THE INVENTION

According to one aspect of the present invention, a fluid regulator includes a housing that includes a flow path extending from an inlet to an outlet. A poppet valve is disposed within the flow path and that selectively allows a flow of fluid from the inlet to the outlet. A regulating interface adjusts a spring tension that is exerted toward the poppet valve. The regulating interface defines a boundary of the flow path and the spring tension defines a regulated flow of fluid through the flow path from the inlet to the outlet. A fluid purge mechanism is positioned within the regulating interface. The fluid purge mechanism adjusts the boundary of the flow path and manipulates the poppet valve to a maximum operating position to define a purging flow of the fluid from the inlet to the outlet.

According to another aspect of the present invention, a fluid regulator includes a housing that defines an internal flow path and an internal regulating path that intersects the internal flow path. A poppet valve is disposed within the internal regulating path and the internal flow path. The poppet valve, in a standard state, defines a selectively regulated flow of fluid through the internal flow path. A poppet biasing force biases the poppet valve to a closed position. A regulating interface is positioned within the internal regulating path. The regulating interface operates to overcome the poppet biasing force to define the selectively regulated flow of fluid. A fluid purge mechanism is positioned within the regulating interface. The fluid purge mechanism manipulates the poppet valve to define a maximum operating position that defines a purging flow of fluid through the internal flow path.

According to another aspect of the present invention, a fluid regulator includes a housing that defines an internal flow path and an internal regulating path that intersects the internal flow path. An operable seal defines a boundary of the internal flow path and separates a portion of the internal regulating path from the internal flow path. A poppet valve is disposed within the internal regulating path and the internal flow path. The poppet valve, in a standard state, is configured to define a selectively regulated flow of fluid through the internal flow path. A threaded regulating interface is positioned within the internal regulating path. The regulating interface adjusts a spring tension exerted against the operable seal to define a rate of the selectively regulated flow of the fluid. A fluid purge mechanism is slidably disposed within the regulating interface. The fluid purge mechanism manipulates the spring tension independent of the threaded regulating interface to define a maximum operating position that defines a purging flow of fluid through the internal flow path.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
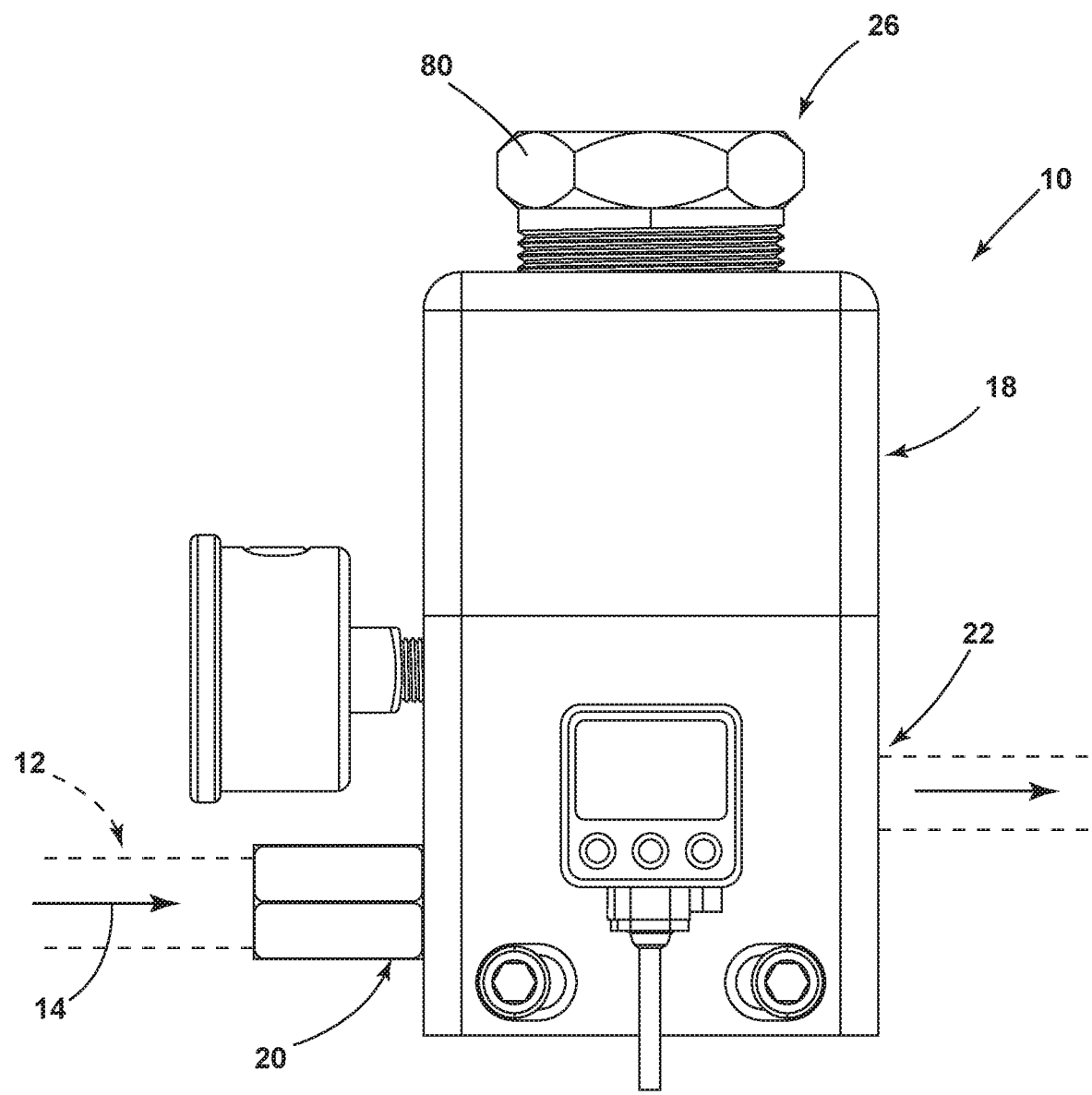
FIG. 1 is a front elevational view of a fluid regulator incorporating a pressure gauge, an electrical controller and an input valve.
Figure 2:
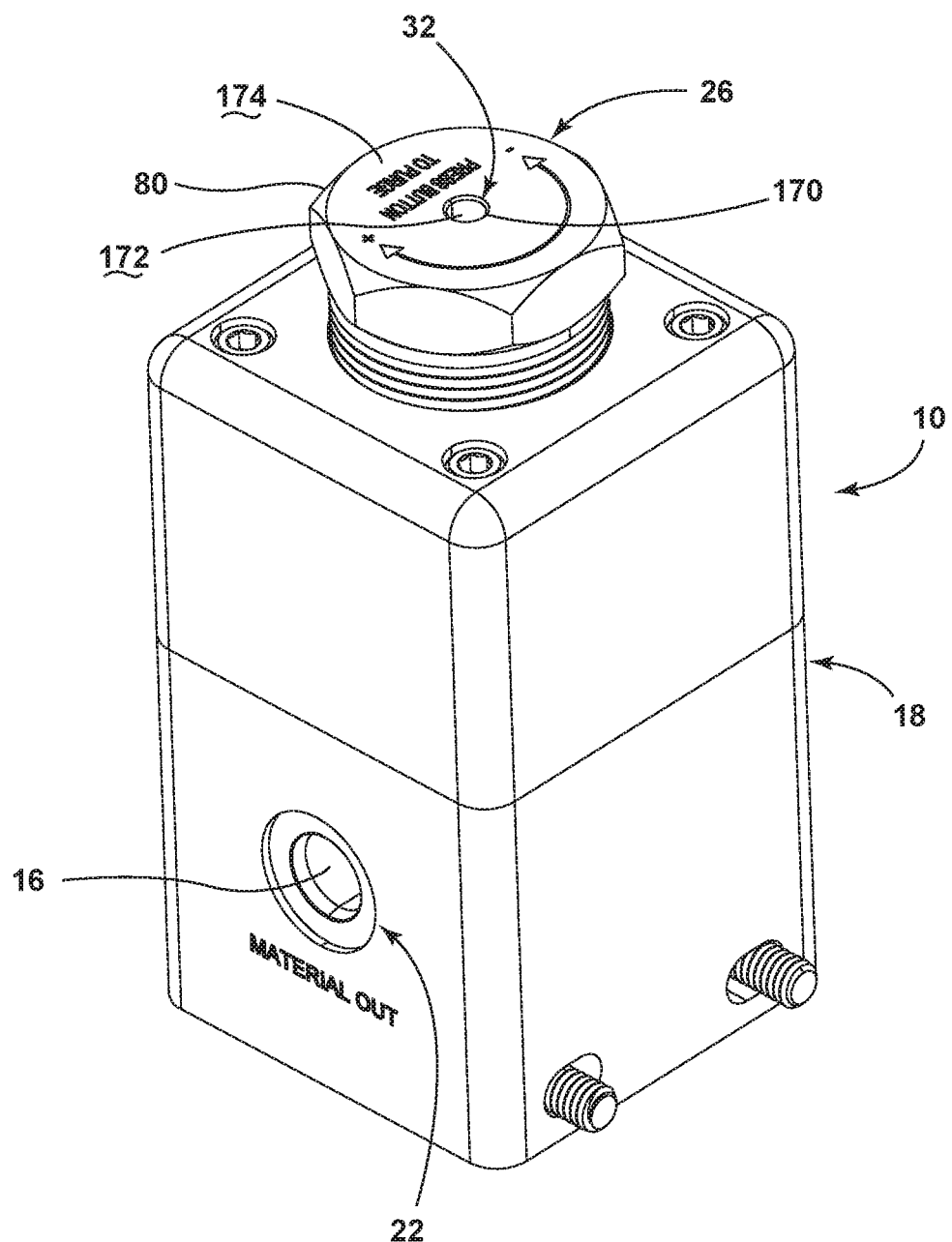
FIG. 2 is a side perspective view of an aspect of the fluid regulator.
Figure 3:
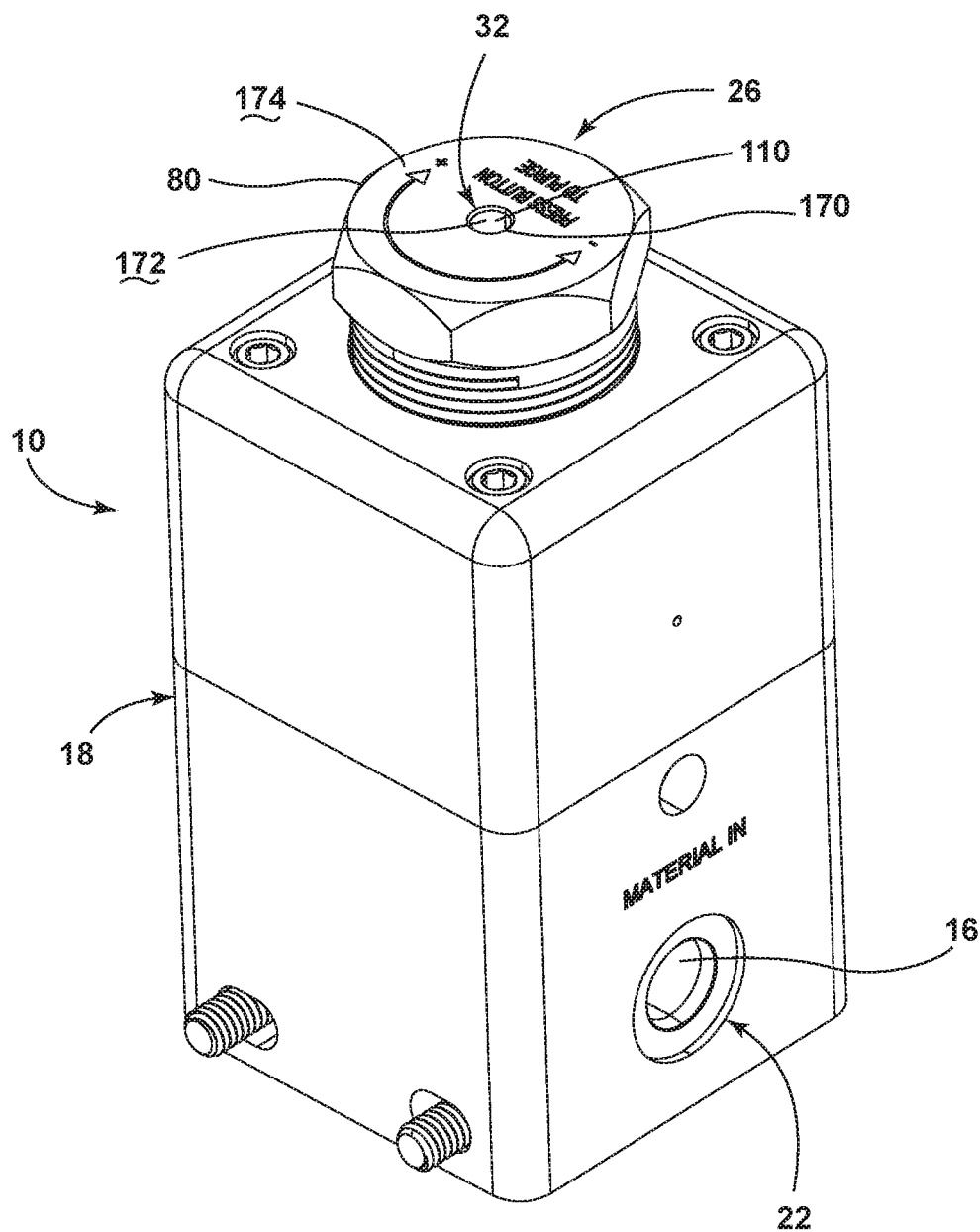
FIG. 3 is a side perspective view of the fluid regulator of FIG. 2.
Figure 4:
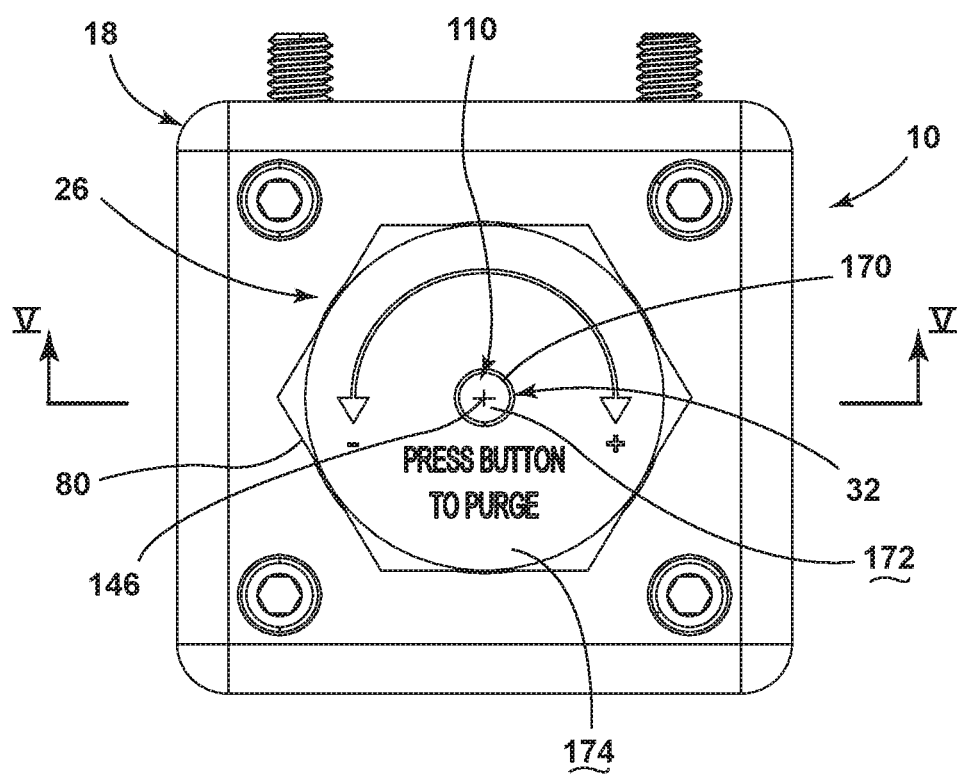
FIG. 4 is a top plan view of the fluid regulator of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-10, reference numeral 10 generally refers to a fluid regulator that can be used within a fluid flow system 12 for regulating and adjusting an amount of fluid 14 that can pass through a particular flow path 16. The fluid regulator 10 can be incorporated within various mechanisms that can include, but are not limited to, dispensers, reservoirs, dispensing tools, fluid flow systems 12, and other similar assemblies. According to various aspects of the device, the fluid regulator 10 includes a housing 18 that includes a flow path 16 extending from an inlet 20 to an outlet 22. A poppet valve 24 is disposed within the flow path 16 and selectively allows of a flow of fluid 14 from the inlet 20 to the outlet 22. A regulating interface 26 is included that adjusts a spring tension 28 that is exerted toward the poppet valve 24. The regulating interface 26 defines a boundary 34 of the flow path 16. The spring tension 28 defines a regulated flow 30 of fluid 14 through the flow path 16 from the inlet 20 and to the outlet 22. A fluid purge mechanism 32 is positioned within the regulating interface 26. The fluid purge mechanism 32 adjusts the boundary 34 of the flow path 16 toward the poppet valve 24 and manipulates the poppet valve 24 to a purging open position 36 to define a purging flow 38 of the fluid 14 from the inlet 20 to the outlet 22.

Fluid 14 is caused to move through the fluid regulator 10 via operation of a pump (not shown) that causes a pressure of fluid 14 within the fluid regulator 10. As the pump operates, the pressure of the fluid 14 moving through the fluid regulator 10 increases. This increase in pressure causes the fluid 14 to bias the poppet valve 24, in cooperation with a poppet spring 50, toward a poppet seat 52. In this manner, a poppet surface 54 of the poppet valve 24 is biased against the poppet seat 52 to define a closed position 56 of the poppet valve 24. The poppet surface 54 is a generally conical surface and as the pressure of the fluid 14 behind the poppet surface 54 increases, this pressure can cause an increased poppet biasing force 58 in the direction of the closed position 56 of the poppet valve 24. Operation of the regulating interface 26 biases the poppet surface 54 away from the poppet seat 52 and overcomes the poppet biasing force 58 of the poppet spring 50 including any biasing force generated by the pressure of the fluid 14. By separating the poppet surface 54 from the poppet seat 52 to form a space 100, a selectively regulated flow 30 of fluid 14 through the poppet valve 24 is created.

As exemplified in FIGS. 2-6, the regulating interface 26 includes a biasing spring 70 that defines a spring tension 28 that biases an operable seal 74 toward the poppet valve 24. The poppet biasing force 58 opposes the spring tension 28. In this configuration, operation of the regulating interface 26 causes the predetermined spring tension 28 to overcome the poppet biasing force 58 and separate the poppet surface 54 from the poppet seat 52. A minimal operation of the regulating interface 26 will typically generate a minimal separation, or space 100, between the poppet surface 54 and the poppet seat 52, thereby causing a small magnitude of the regulated flow 30 of the fluid 14. Conversely, greater operation of the regulating interface 26 toward the poppet valve 24 can increase the separation, or space 100, between the poppet surface 54 and the poppet seat 52. This greater separation results in a higher magnitude of the regulated flow 30 of the fluid 14.

Referring again to FIGS. 2-6, the regulating interface 26 includes a threaded bolt 80 that is rotationally operable within the housing 18 to define a plurality of axial positions 82 of the threaded bolt 80 for the regulating interface 26. The plurality of axial positions 82 corresponds to a respective plurality of spring tensions 28. The plurality of spring tensions 28 includes any one of the predetermined spring tensions 28 that may be set through operation of the threaded bolt 80 for the regulating interface 26. By way of example, and not limitation, operation of the threaded bolt 80 toward the poppet valve 24 serves to increase the spring tension 28 that is exerted in the direction of the poppet valve 24, and, in turn, varying and corresponding sizes of the space 100 between the poppet surface 54 and the poppet seat 52. By increasing the spring tension 28 exerted toward the poppet valve 24, the spring tension 28 of the biasing spring 70 moves the poppet surface 54 farther from the poppet seat 52 to define a larger space 100. Conversely, where the threaded bolt 80 is operated away from the poppet valve 24, the space 100 becomes smaller and the magnitude of the regulated flow 30 of the fluid 14 is decreased.

Figure 5:
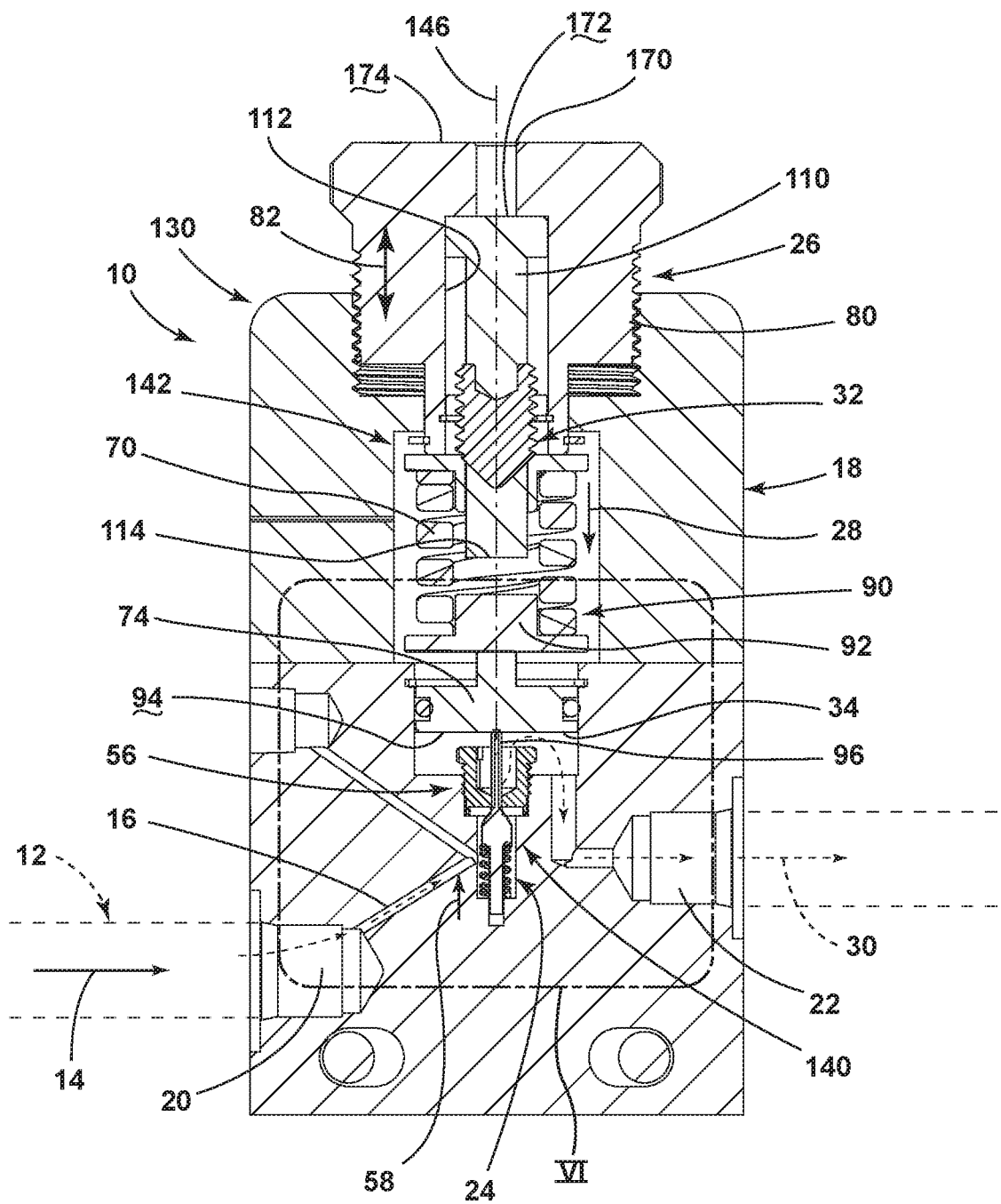
FIG. 5 is a cross-sectional view of the fluid regulator of FIG. 4 taken along line V-V.
Figure 6:
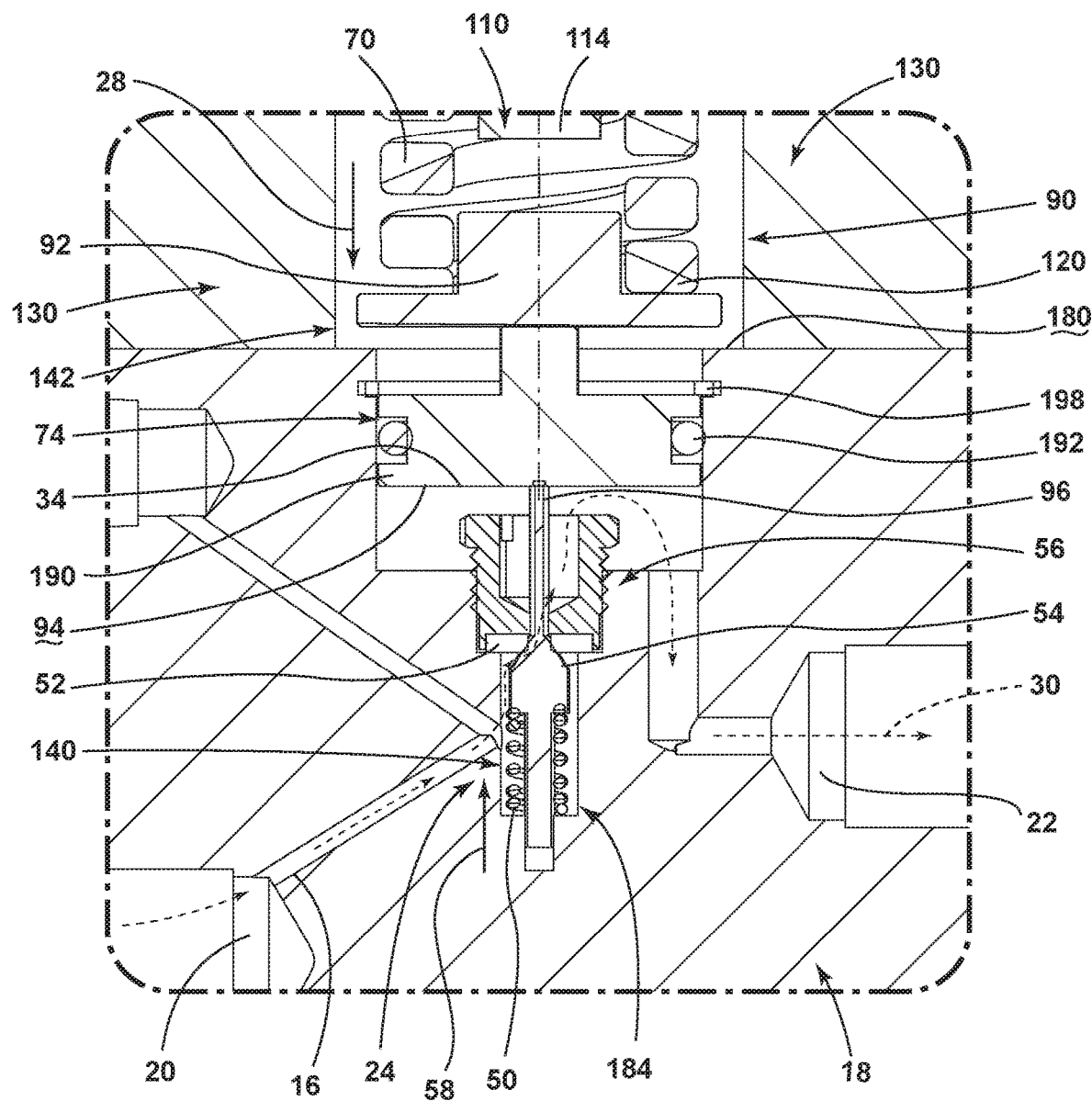
FIG. 6 is an enlarged cross-sectional view of the fluid regulator of FIG. 5 taken at area VI.
Figure 7:
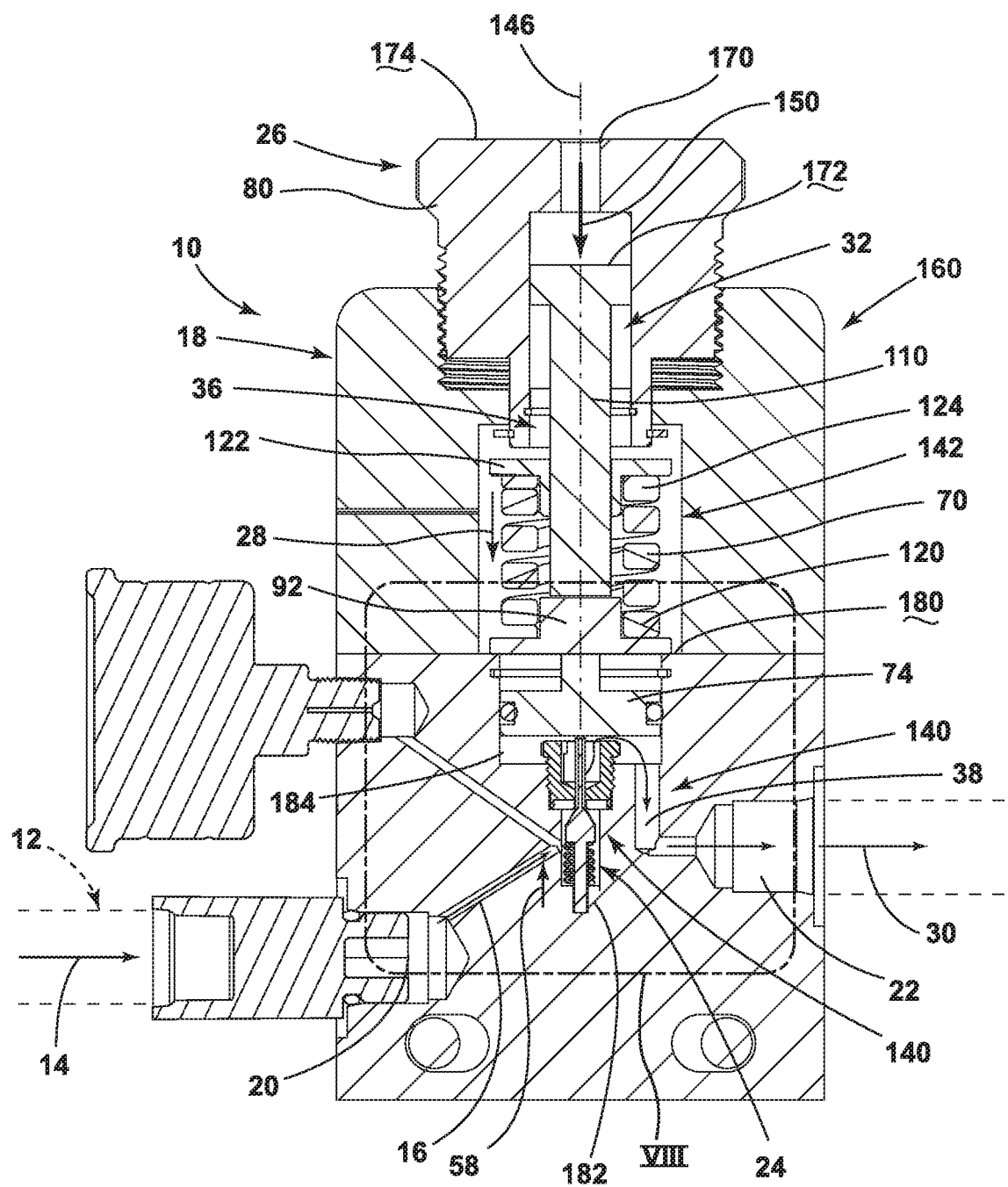
FIG. 7 is a cross-sectional view of the fluid regulator of FIG. 5 and showing an aspect of the purge mechanism in a purging state.
Figure 8:
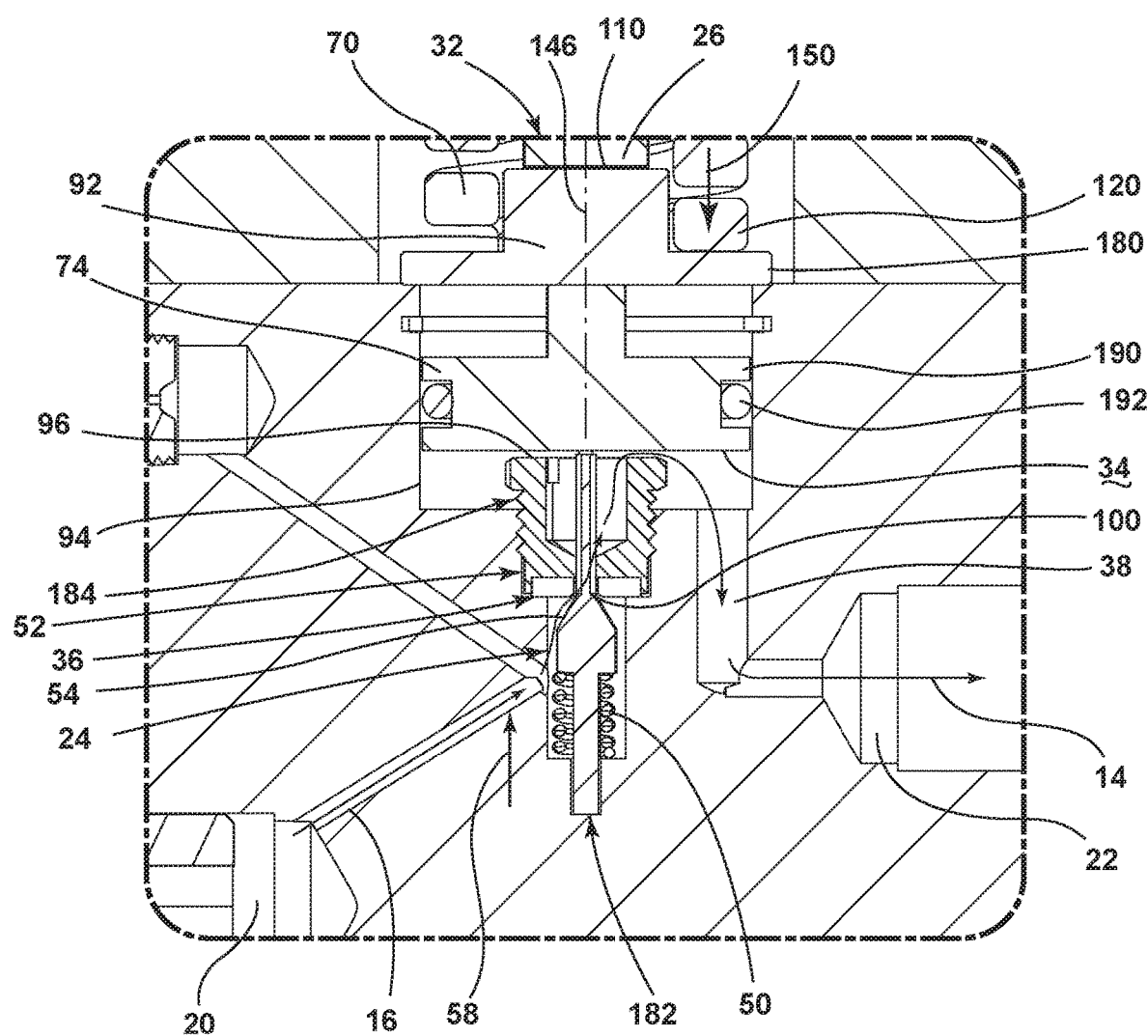
FIG. 8 is an enlarged cross-sectional view of the fluid regulator of FIG. 7 taken at area VIII.
Figure 9:
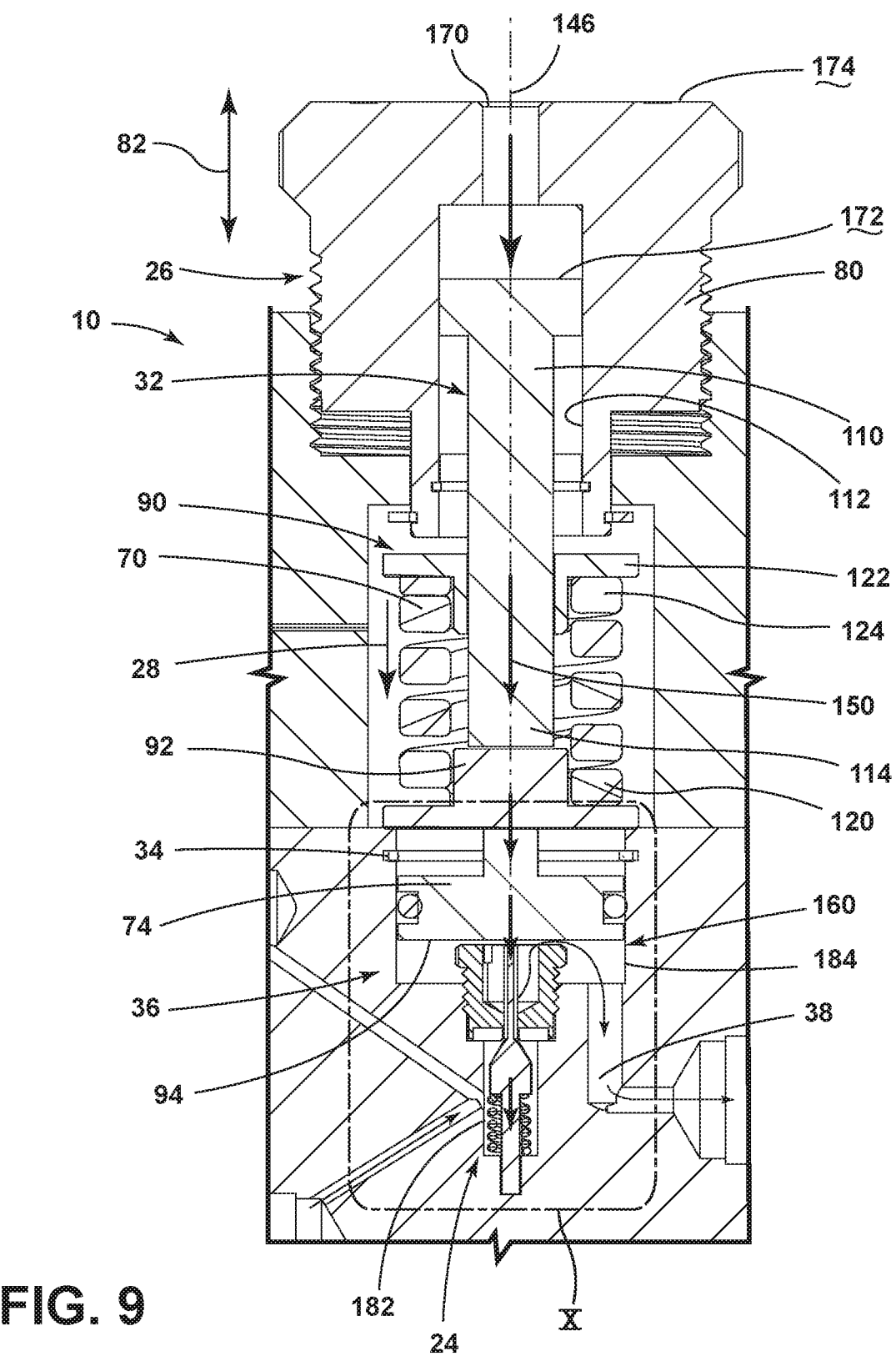
FIG. 9 is an enlarged cross-sectional view of the fluid regulator of FIG. 7 and showing operation of the purge mechanism toward the continuously open position.
Figure 10:
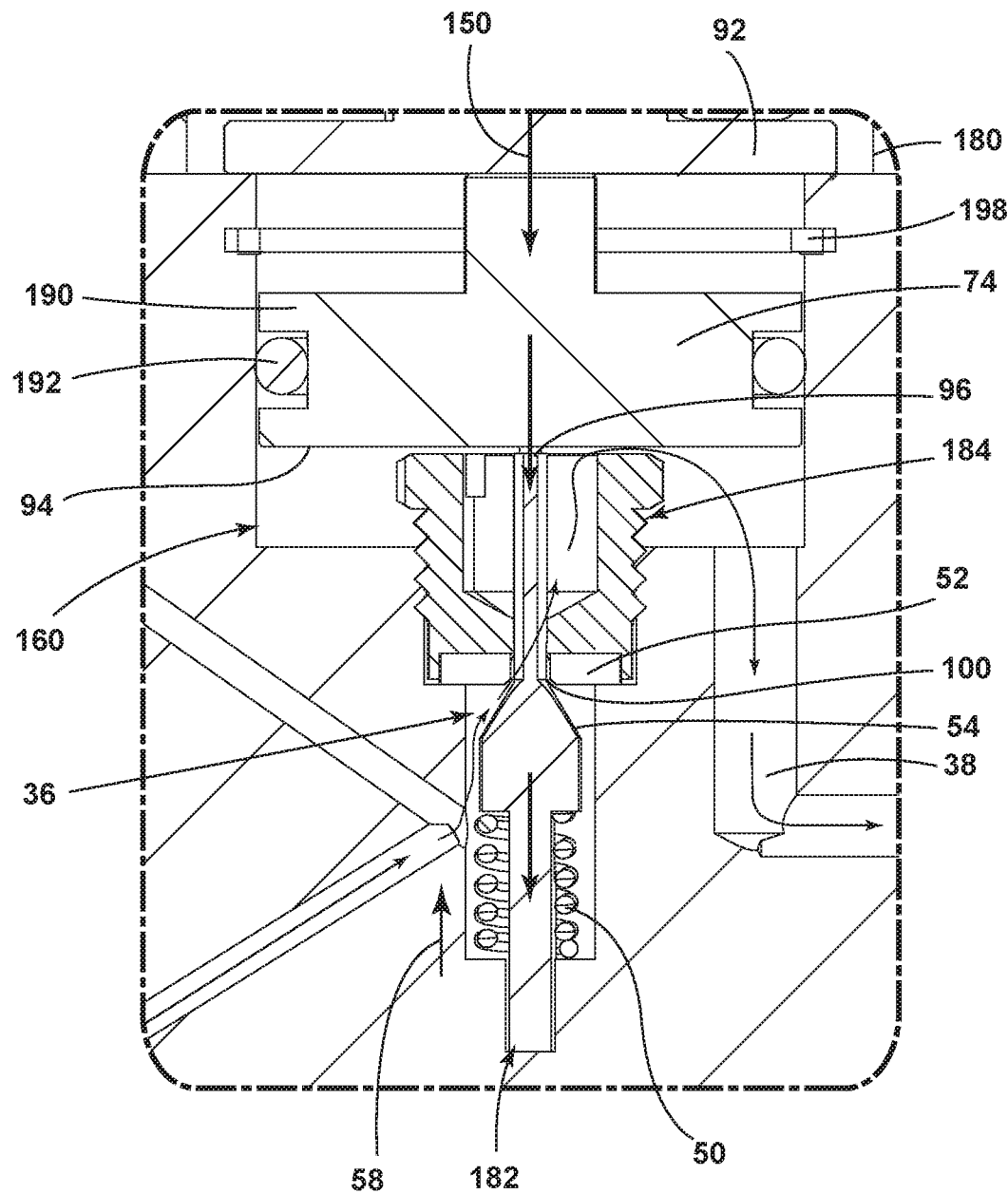
FIG. 10 is an enlarged cross-sectional view of the flow regulator of FIG. 9 taken at area X.

Referring now to FIGS. 5 and 6, as the fluid 14 moves through the inlet 20 and toward the poppet valve 24, the operable seal 74 that is positioned within an internal regulating path 90 is engaged by a transfer member 92 that transfers the predetermined spring tension 28 from the biasing spring 70 and toward the operable seal 74. An operating surface 94 of the operable seal 74 engages a poppet actuator 96 of the poppet valve 24. Typically, the operating surface 94 of the operable seal 74 is in continual engagement with the poppet actuator 96. As the threaded bolt 80 is adjusted, the spring tension 28 that is exerted by the biasing spring 70 and against the poppet actuator 96 is varied, as is the position and space 100 of the poppet surface 54 in relation to the poppet seat 52.

During operation of the fluid regulator 10, particulate matter, dirt, and other debris may become lodged within the space 100 between the poppet surface 54 and the poppet seat 52. This debris can result in a blockage that prevents the poppet valve 24 from defining the closed position 56 or smaller space 100. This blockage can, in turn, cause leakage within the fluid regulator 10 because the poppet valve 24 is unable to fully close and stop the flow of fluid 14. In conditions where a blockage may be present, operation of the fluid purge mechanism 32 can be utilized to dislodge the blockage. The fluid purge mechanism 32 allows for an increased flow of the fluid 14 to remove the blockage, thereby allowing the poppet valve 24 to close.

Referring now to FIGS. 4-10, the fluid purge mechanism 32 is positioned within the threaded bolt 80 and between the threaded bolt 80 and the biasing spring 70. Engagement of the fluid purge mechanism 32 operates the biasing spring 70 to define the purging open position 36 of the poppet valve 24. Through this configuration, the fluid purge mechanism 32 includes a pin 110 that is slidably operable within an interior bore 112 of the threaded bolt 80. When the pin 110 for the fluid purge mechanism 32 is operated, an engaging end 114 of the pin 110 presses against the transfer member 92, which, in turn, presses against the operable seal 74 and the poppet actuator 96. Manual operation of the pin 110 for the fluid purge mechanism 32 provides a bypass tension 150 that is a sufficient force to further overcome the poppet biasing force 58 of the poppet spring 50. Through this engagement of the pin 110 for the fluid purge mechanism 32, the poppet surface 54 is moved away from the poppet seat 52 regardless of the position of the threaded bolt 80 and regardless of the magnitude of the spring tension 28 exerted by the biasing spring 70 against the fluid purge mechanism 32.

Where the poppet valve 24 is in the closed position 56, operation of the fluid purge mechanism 32 can open the poppet valve 24. Also, where the threaded bolt 80 is operated to define a regulated flow 30 of the fluid 14, operation of the fluid purge mechanism 32 can increase the space 100 between the poppet surface 54 and the poppet seat 52 and increase the flow of the fluid 14 to define the purging flow 38 of the fluid 14. Accordingly, the fluid purge mechanism 32 can be engaged for defining the purging flow 38 of the fluid 14 in each of the plurality of axial positions 82 of the threaded bolt 80 for the regulating interface 26. This increased flow of fluid 14 that is indicative of the purging flow 38 is typically able to dislodge blockages in and around the poppet valve 24.

Referring again to FIGS. 5-10, the regulating interface 26 can include the transfer member 92 that is positioned at a seal end 120 of the biasing spring 70, where the transfer member 92 is configured to engage the operable seal 74. A bypass plate 122 is positioned at an interface end 124 of the biasing spring 70, wherein the fluid purge mechanism 32 is operably coupled with the bypass plate 122 to selectively engage the biasing spring 70. The bypass plate 122 is positioned between the threaded bolt 80 and the biasing spring 70. Through this configuration, when the pin 110 of the fluid purge mechanism 32 is engaged, the bypass plate 122 may be separated from the threaded bolt 80 to allow for efficient movement of the transfer member 92 towards the operable seal 74 and the poppet actuator 96.

In certain aspects of the device, the bypass plate 122 may be coupled with the threaded bolt 80 and operation of the pin 110 for the fluid purge mechanism 32 extends the biasing spring 70 in the direction of the poppet valve 24. In the various configurations, manipulation of the pin 110 for the fluid purge mechanism 32 supplements the spring tension 28 exerted by the biasing spring 70 to overcome, or further overcome, the poppet biasing force 58 and manipulate the poppet surface 54 away from the poppet seat 52. As discussed above, manual operation of the fluid purge mechanism 32 generates the purging flow 38 of the fluid 14 from the inlet 20 to the outlet 22 in a manner independent of the operation of the threaded bolt 80 of the regulating interface 26.

Referring again to FIGS. 1-10, the fluid regulator 10 includes the housing 18 that defines an internal flow path 16 and the internal regulating path 90 that intersects the internal flow path 16. The poppet valve 24 is disposed within the internal regulating path 90 and extends into the internal flow path 16. The poppet valve 24, in a standard state 130, defines the selectively regulated flow 30 of fluid 14 through the internal flow path 16. The poppet biasing force 58 biases the poppet valve 24 to a closed position 56 such that the poppet surface 54 is engaged with the poppet seat 52. The regulating interface 26 is positioned within the internal regulating path 90. The regulating interface 26 is selectively operable to overcome the poppet biasing force 58 to define the selectively regulated flow 30 of fluid 14. As discussed previously, manipulation of the regulating interface 26 changes the predetermined spring tension 28 that is exerted in opposition to the poppet biasing force 58. This manipulation of the regulating interface 26 adjusts the amount of separation and the size of the space 100 between the poppet surface 54 and the poppet seat 52 to modify the magnitude of the selectively regulated flow 30 of fluid 14. The fluid purge mechanism 32 is positioned within the regulating interface 26 and extends, typically, along a central rotational axis 146 of the regulating interface 26. The fluid purge mechanism 32 further manipulates the poppet valve 24 to define the purging open position 36 that defines the purging flow 38 of the fluid 14 through the internal flow path 16 from the inlet 20 to the outlet 22.

As discussed previously, the operable seal 74 separates the internal regulating path 90 into the poppet portion 140 and the regulating portion 142. The poppet portion 140 intersects the internal flow path 16. The poppet valve 24 is positioned within the poppet portion 140 and the regulating interface 26 and the fluid purge mechanism 32 are each positioned within the regulating portion 142 of the internal regulating path 90. The regulating interface 26 includes a biasing spring 70 that engages the operable seal 74. Operation of a regulating member, typically in the form of the threaded bolt 80, defines the predetermined spring tension 28 of the biasing spring 70 that acts in opposition to the poppet biasing force 58 of the poppet spring 50. The amount of the predetermined spring tension 28 that is exerted upon the operable seal 74 is determined by the predetermined spring tension 28 of the biasing spring 70. Additionally, the position of the operable seal 74 is determined by the predetermined spring tension 28 of the biasing spring 70 to define the magnitude and rate of the regulated flow 30 of the fluid 14.

Referring again to FIGS. 5-10, in certain aspects of the device, the fluid purge mechanism 32 includes a slidably operable pin 110 that operates within a threaded bolt 80 to engage the bypass plate 122. It is contemplated that the bypass plate 122 can separate from the threaded bolt 80 to adjust the predetermined spring tension 28 to define the bypass tension 150. This bypass tension 150 is exerted against the transfer member 92 such that the operating surface 94 of the operable seal 74 engages the poppet actuator 96 to overcome the poppet biasing force 58 and separate, or further separate, the poppet surface 54 from the poppet seat 52. Through this configuration, manipulation of the pin 110 for the fluid purge mechanism 32 defines the purging open position 36 of the poppet valve 24 that allows for the increased flow of fluid 14 that is indicative of the purging flow 38 of fluid between the inlet 20 to the outlet 22.

Referring again to FIGS. 1-10, the fluid regulator 10 includes the housing 18 that defines the internal flow path 16 and the internal regulating path 90 that intersect at the internal flow path 16. The operable seal 74 defines a boundary 34 of the internal flow path 16 and separates a portion of the internal regulating path 90 from the internal flow path 16. The poppet valve 24 is disposed within the internal regulating path 90 and also within the internal flow path 16. Where the poppet valve 24 is in a standard state 130, as opposed to the purge state 160, the poppet valve 24 is configured to define the selectively regulated flow 30 of fluid 14 through the internal flow path 16. The threaded regulating interface 26 is positioned within the internal regulating path 90 and outside of the internal flow path 16. The regulating interface 26 adjusts the spring tension 28 that is exerted against the operable seal 74 and in opposition to the poppet biasing force 58. As discussed previously, this opposition between the spring tension 28 and the poppet biasing force 58 determines the rate of the regulated flow 30 of fluid 14 from the inlet 20 to the outlet 22. The fluid purge mechanism 32 is slidably disposed within the regulating interface 26, wherein the fluid purge mechanism 32 manipulates the spring tension 28 independently of the threaded regulating interface 26. This independent operation of the fluid purge mechanism 32 defines the purging open position 36 and the purging flow 38 of fluid 14 through the internal flow path 16. As discussed above, operation of the fluid purge mechanism 32 serves to overcome, independently of the position of the threaded regulating interface 26, the poppet biasing force 58 to separate, or further separate, the poppet surface 54 from the poppet seat 52.

Referring again to FIGS. 5-10, the pin 110 for the fluid purge mechanism 32 is included within an interior bore 112 of the regulating interface 26. The threaded bolt 80 includes a purge aperture 170 that allows for a tool to be inserted therethorugh for engaging the pin 110. A purge interface, such as a purge activating surface 172 of the pin 110 is typically positioned below an upper surface 174 of the threaded bolt 80. This configuration prevents inadvertent activation of the fluid purge mechanism 32. When the fluid purge mechanism 32 is desired to be activated, a tool can be inserted through the purge aperture 170 and the pin 110 can be slidably biased toward the poppet valve 24. As discussed previously, the fluid purge mechanism 32 can be activated in any of the plurality of axial positions 82 of the threaded bolt 80 for the regulating interface 26. As the pin 110 is moved toward the poppet valve 24, the pin 110 engages the transfer member 92 and, in turn, the operable seal 74. This engagement causes the operating surface 94 of the operable seal 74 to bias the poppet actuator 96 toward the poppet seat 52 and, in turn, separate or further separate the poppet surface 54 from the poppet seat 52.

The internal regulating path 90 includes a stopping surface 180 that prevents the transfer member 92 from moving too close to the poppet valve 24. This stopping surface 180 defines a maximum operating position 182 of the transfer member 92 and defines a position at which the transfer member 92 can engage the operable seal 74 for pressing the poppet actuator 96 toward the poppet spring 50 for providing a maximum size of space 100 between the poppet surface 54 and the poppet seat 52. This configuration results in a maximum purging flow 38 of the fluid 14. This stopping surface 180 also prevents overreaching movement of the pin 110 and the transfer member 92 that might cause the operable seal 74 to engage a poppet chamber 184 that surrounds the poppet actuator 96. The stopping surface 180 may also include an area below the poppet valve 24 that defines a maximum operating position 182 of the space 100 between the poppet surface 54 and the poppet seat 52. Accordingly, a completely engaged position of the transfer member 92 positions the operating surface 94 of the operable seal 74 in a slightly offset configuration from the poppet chamber 184. Through this configuration, engagement of the operating surface 94 with the poppet chamber 184 is prevented to allow for the continuous purging flow 38 of fluid 14 from the inlet 20 and through the outlet 22.

As exemplified in FIGS. 5-10, the fluid purge mechanism 32 is included within the internal regulating path 90 that accommodates the regulating interface 26. By including the fluid purge mechanism 32 within the regulating interface 26, an additional aperture or opening within the housing 18 is not needed. Accordingly, manufacture of the housing 18 can be accomplished without adding additional apertures within the housing 18 that may result in sources of leaks or other failures within the fluid regulator 10.

During manufacture of the fluid regulator 10, the regulating interface 26 can be manufactured with the fluid purge mechanism 32 incorporated therein. Accordingly, the regulating interface 26 and the fluid purge mechanism 32 can be installed within the housing 18 for the fluid regulator 10 as a single piece. Additionally, manipulation of the threaded bolt 80 for the regulator interface may also result in the manipulation of the pin 110 for the fluid purge mechanism 32. The interior bore 112 of the regulating interface 26 that houses the pin 110 that at least partially defines the fluid purge mechanism 32 can extend through the threaded bolt 80 and also through the bypass plate 122. Accordingly, the bypass plate 122 serves to align the engaging end 114 of pin 110 with the transfer member 92 for engaging the fluid purge mechanism 32.

According to various aspects of the device, the fluid regulator 10 disclosed herein can be incorporated within any one of various fluid assemblies. Additionally, the fluid regulator 10 can be used for various fluids 14 that can be moved through the fluid regulator 10. Such fluids 14 can include fluids 14 having various viscosities, adhesiveness, and other material characteristics that can be seen within various fluids 14 that are moved through delivery assemblies.

As exemplified in FIGS. 5-10, the operable seal 74 can include an operable disk 190 that includes a perimeter seal 192 that extends around the operable seal 74 and engages the interior bore 112 of the internal regulating path 90. This perimeter seal 192 prevents the flow of fluid 14 around the operable seal 74 and into the regulating portion 142 of the internal regulating path 90. Additionally, the internal regulating path 90 can include a seal retainer 198 that is disposed within the interior bore 112 of the internal regulating path 90. This device prevents the movement of the operable seal 74 away from the poppet valve 24 and can also contain the operable seal 74 in position during manufacture and assembly of the fluid regulator 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fluid regulator comprising:
  a housing that includes a flow path extending from an inlet to an outlet;
  a poppet valve that is disposed within the flow path and that selectively allows a flow of fluid from the inlet to the outlet;
  a regulating interface that adjusts a spring force that is exerted toward the poppet valve, wherein the regulating interface defines a boundary of the flow path and wherein the spring force defines a regulated flow of fluid through the flow path from the inlet to the outlet, wherein the regulating interface comprises:
    a biasing spring that defines a predetermined spring force that biases an operable seal toward the poppet valve, wherein a poppet biasing force opposes the predetermined spring force; and
    a threaded bold that is rotationally operable within the housing to define a plurality of axial positions, wherein the plurality of axial positions corresponds to a respective plurality of spring forces, wherein the plurality of spring forces includes the predetermined spring force; and
  a fluid purge mechanism positioned within the regulating interface, wherein the fluid purge mechanism adjusts the boundary of the flow path and manipulates the poppet valve to a maximum operating position to define a purging flow of the fluid from the inlet to the outlet, wherein the fluid purge mechanism is positioned between the threaded bolt and the biasing spring, wherein engagement of the fluid purge mechanism operates the biasing spring to define the maximum operating position of the poppet valve.

2. The fluid regulator of claim 1, wherein the fluid purge mechanism is a pin that is slidably operable within the threaded bolt.

3. The fluid regulator of claim 2, further comprising:
  a spring-force transfer member positioned at a seal end of the biasing spring and that engages the operable seal;
  a bypass plate positioned at an interface end of the biasing spring, wherein the fluid purge mechanism is operably coupled with the bypass plate to selectively engage the biasing spring, wherein the bypass plate is positioned between the threaded bolt and the biasing spring.

4. A fluid regulator comprising:
  a housing that defines an internal flow path and an internal regulating path that intersects the internal flow path;
  an operable seal that separates the internal regulating path into a poppet portion and a regulating portion, wherein the poppet portion intersects the internal flow path;
  a poppet valve that is disposed within the internal regulating path and the internal flow path, wherein the poppet valve in a standard state defines a selectively regulated flow of fluid through the internal flow path, wherein a poppet biasing force biases the poppet valve to a closed position;

a regulating interface positioned within the internal regulating path, wherein the regulating interface operates to overcome the poppet biasing force to define the selectively regulated flow of fluid, wherein the regulating interface includes a biasing spring that engages the operable seal wherein operation of a regulating member of the regulating interface defines a predetermined spring force of the biasing spring; and a fluid purge mechanism positioned within the regulating interface, wherein the fluid purge mechanism manipulates the poppet valve to define a maximum operating position that defines a purging flow of fluid through the internal flow path, wherein the regulating interface includes a threaded bolt that rotates about a central rotational axis and within the threaded bolt, purge mechanism is positioned along the central rotational axis and within the threaded bolt, wherein the fluid purge mechanism is a pin that slidably operates within the threaded bolt to engage a bypass plate, wherein the bypass plate adjusts the predetermined spring force to a bypass force that places the poppet valve in the maximum operating position, wherein the biasing spring is positioned between the bypass late and a spring-force transfer member that engages the operable seal.

5. The fluid regulator of claim 4, wherein the poppet valve is positioned within the poppet portion, and the regulating interface and the fluid purge mechanism are positioned within the regulating portion.

6. The fluid regulator of claim 4, wherein operation of the fluid purge mechanism is independent of the operation of the regulating member.

7. The fluid regulator of claim 6, wherein the fluid purge mechanism is accessible through an aperture defined within the regulating interface.

8. A fluid regulator comprising:

a housing that defines an internal flow path and an internal regulating path that intersects the internal flow path;

an operable seal that defines a boundary of the internal flow path and separates a portion of the internal regulating path from the internal flow path;

a poppet valve that is disposed within the internal regulating path and the internal flow path, wherein the poppet valve in a standard state is configured to define a selectively regulated flow of fluid through the internal flow path;

a threaded regulating interface positioned within the internal regulating path, wherein the threaded regulating interface adjusts a spring force exerted against the operable seal to define a rate of the selectively regulated flow of the fluid; and a fluid purge mechanism slidably disposed within the threaded regulating interface, wherein the fluid purge mechanism manipulates the spring force independent of the threaded regulating interface to define a maximum operating position that defines a purging flow of fluid through the internal flow path.

9. The fluid regulator of claim 8, wherein the operable seal separates the internal regulating path into a poppet portion and a regulating portion, wherein the poppet portion intersects the internal flow path.

10. The fluid regulator of claim 8, wherein the threaded regulating interface is coupled with a biasing spring that extends between the operable seal and the fluid purge mechanism, wherein operation of the threaded regulating interface defines a predetermined spring force of the biasing spring.

11. The fluid regulator of claim 8, wherein the threaded regulating interface includes a purge interface that extends through a portion of the threaded regulating interface to an axially sliding pin of the fluid purge mechanism.

12. The fluid regulator of claim 8, wherein the fluid purge mechanism is a slidably operable pin that extends through the threaded regulating interface, where the slidably operable pin axially operates along a central axis of the threaded regulating interface.

13. The fluid regulator of claim 12, wherein a poppet biasing force of the poppet valve is overcome through operation of the threaded regulating interface to define the selectively regulated flow of fluid, and is overcome by the fluid purge mechanism to define the purging flow of fluid.

* * * * *

UNITED STATES PATENT AND TRADEMARK OFFICE
CERTIFICATE OF CORRECTION

PATENT NO. : 11,118,691 B2
APPLICATION NO. : 16/587691
DATED : September 14, 2021
INVENTOR(S) : Schierbeek et al.

It is certified that error appears in the above-identified patent and that said Letters Patent is hereby corrected as shown below:

In the Claims

<u>Column 9</u>
Claim 4, Line 10, after "seal" insert --,--.
Claim 4, Line 19, after "axis" insert --,--.
Claim 4, Line 19, "within the threaded bolt," should be --wherein the fluid--.
Claim 4, Line 27, "late" should be --plate--.

Signed and Sealed this
Seventeenth Day of May, 2022

Katherine Kelly Vidal
*Director of the United States Patent and Trademark Office*